June 25, 1929. L. BAENZIGER Re. 17,341

FUSE PLUG

Original Filed Feb. 23, 1927

INVENTOR
Leonard Baenziger
By Samuel Siegel
ATTORNEY

Reissued June 25, 1929. Re. 17,341

UNITED STATES PATENT OFFICE.

LEONARD BAENZIGER, OF ABINGTON, MASSACHUSETTS, ASSIGNOR TO ACME ELECTRIC MANUFACTURING CO., OF CHELSEA, MASSACHUSETTS, A CORPORATION OF MASSACHUSETTS.

FUSE PLUG.

Original No. 1,668,138, dated May 1, 1928, Serial No. 170,089, filed February 23, 1927. Application for reissue filed February 21, 1929. Serial No. 341,854.

This invention relates to fuse plugs or those which are so designed as to be threaded into sockets similar to those ordinarily employed to receive the bases of incandescent lamps. The object of my invention is the production of a glass top fuse plug which will not break or shatter when it blows out. Glass for this purpose is much superior to mica which has been used commonly heretofore, since it does not darken or become more or less opaque with lapse of time as does mica, nor does it vary in color or transparency so that the fusible element is easily visible therethrough. The detection of blown fusible elements is thus made very easy, which is not true of those heretofore commonly used. A glass top, however, is liable to be broken if the hot vaporized metal is permitted to impinge directly on its side walls when the fusible element blows, this not only permitting the immediate escape of the hot gases and metal vapor with its attendant fire hazard, but also exposing sharp edges of glass at the plug socket, making removal of the blown fuse plug therefrom difficult and dangerous.

This invention is an improvement on the construction shown in my application Serial No. 78,988, filed January 2, 1926.

This invention relates to a construction by which the hot gas and molten metal produced when the fusible element blows out will be prevented from coming in sufficient contact with the walls of the glass to cause breaking or shattering thereof.

Reference will now be had to the drawing forming a part of this application wherein there is illustrated a preferred embodiment of my invention, but it is to be understood that the elements thereof may be varied or changed as to shape, size or form without departing from the spirit of the invention.

Figure 1:
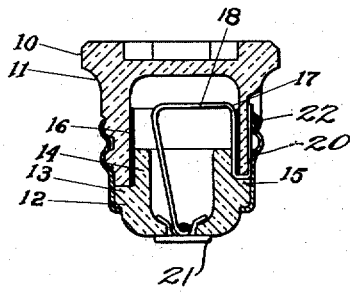
Figure 1 is a vertical section through the center of the fuse plug.
Figure 2:
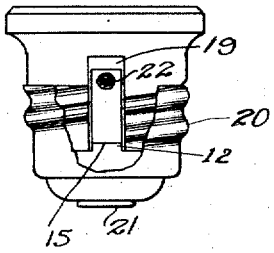
Figure 2 is a view of the fuse plug with the metallic shell partly broken away to show certain parts.

10 designates a fuse plug having a hollow top member or body 11 of a transparent material such as glass. The lower edge of the hollow top member has a rectangular indenture or opening 12. The bottom part of the fuse plug 12′ is made of porcelain with an annular shoulder 13 against which the lower edge of the glass member 11 may engage and an annular extension 14 which projects within the glass top. The shoulder 13 carries an extension 15 which fits into the opening 12, thus preventing relative rotation between the base and top members when they are assembled. A metallic shell 20, preferably of copper or brass, has threads which may be engaged externally with threads of the fuse plug receiving socket, and which engage internally with mating threaded portions externally of the top member 11. A sleeve 16 of electro-non-conducting material and preferably heat insulating is positioned within the side portions of the top member 11 and outwardly of the annular extension 14.

The fusible element 17 is connected to a conducting rivet or button 21 which extends through the base member 12′ in the usual manner, forms a loop 18 visible through the closed end of the top member 11 and the major portion of which is spaced from the sleeve 16, and it follows along the inside of this sleeve 16 into and through the opening 12, and along a recess or groove 19 in the side of the glass top 11 where it is connected by soldering with the shell 20 in the usual manner as at 22. The attaching of the fusible element 17 to the shell 20 holds the shell 20 against rotation, the fusible element lying within the recess 19, and thus the shell and top and bottom members 11 and 12′ are held assembled.

From this construction it will be seen that the sleeve 16, which is held relatively stationary in the plug, prevents the fusible element from coming in contact with the side of the glass so that when this element blows, the hot gases and molten metal are prevented from coming into direct contact with the sides of the glass, thus preventing shattering thereof.

Having thus described my invention, what I claim is:

1. A fuse plug comprising a hollow glass body closed at one end, a fusible element therein visible through said closed end, and means to prevent hot gases and molten metal from the fusing of said element from coming in sufficient contact with the side walls of said glass body, comprising a sleeve of electro-non-conducting material positioned within said glass body in contiguous relation with the side wall thereof and spaced from the major portion of the fusible element.

2. A fuse plug comprising a hollow transparent body, a fusible element therein, an insulation plug closing the bottom of said body and having a projection extending therein, and means to prevent hot gases and molten metal from coming in sufficient contact with the walls of said body comprising a sleeve of non-conducting material positioned within said body between the walls thereof and the periphery of the projection of said plug in contiguous relation with the walls of said body.

In testimony whereof I have affixed my signature.

LEONARD BAENZIGER.